United States Patent

Duchamp et al.

Patent Number: 5,722,167
Date of Patent: Mar. 3, 1998

[54] METHOD OF SETTING A DESIRED FLOW RATE THROUGH A BEARING

[75] Inventors: Lionel Duchamp, Annecy; Patrick Lorriette, Jaux, both of France

[73] Assignee: AGCO, S.A., England

[21] Appl. No.: 785,483

[22] Filed: Jan. 17, 1997

Related U.S. Application Data

[63] Continuation of Ser. No. 446,956, May 15, 1995, abandoned.

[30] Foreign Application Priority Data

May 17, 1994 [GB] United Kingdom .................. 9409794

[51] Int. Cl.⁶ .................................................... F16C 33/66
[52] U.S. Cl. ..................... 29/898.061; 29/898.07; 29/898.1; 29/898.11; 384/488
[58] Field of Search ................ 29/898.06, 898.061, 29/898.062, 898.09, 898.07, 898.1, 898.11; 384/488, 480, 477

[56] References Cited

U.S. PATENT DOCUMENTS

| | | | |
|---|---|---|---|
| 1,337,597 | 4/1920 | Gilbert | 29/898.1 |
| 2,011,192 | 8/1935 | Comstock | 384/488 |
| 2,034,567 | 3/1936 | Fernström | 384/488 |
| 2,259,325 | 10/1941 | Robinson | 29/898.11 |
| 2,998,287 | 8/1961 | Pritchettt | 384/466 |
| 3,628,835 | 12/1971 | Cornish | 384/465 |
| 3,722,967 | 3/1973 | Lewis | 384/466 |
| 3,811,743 | 5/1974 | Wren | 384/475 |
| 3,915,521 | 10/1975 | Young | 384/467 |
| 3,940,191 | 2/1976 | Tomioka et al. | 384/468 |
| 3,994,544 | 11/1976 | Flatland | 384/488 |
| 4,203,634 | 5/1980 | Back | 384/489 |
| 4,265,334 | 5/1981 | Benhase, Jr. | 184/6.11 |
| 4,286,829 | 9/1981 | Heemskerk | 384/469 |
| 4,334,720 | 6/1982 | Signer | 384/475 |
| 4,343,489 | 8/1982 | Lenz et al. | 384/465 |
| 4,479,682 | 10/1984 | Olivier | 384/475 |
| 4,577,980 | 3/1986 | Weichenrieder | 384/488 |
| 4,848,937 | 7/1989 | Hartman et al. | 384/480 |
| 4,958,943 | 9/1990 | Nakanishi | 384/488 |

FOREIGN PATENT DOCUMENTS

| | | |
|---|---|---|
| 0 059 270 | 9/1982 | European Pat. Off. . |
| 0 268 310 | 5/1988 | European Pat. Off. . |
| 907143 | 10/1962 | United Kingdom . |
| 1060584 | 3/1967 | United Kingdom . |
| 1069307 | 5/1967 | United Kingdom . |
| 1263263 | 2/1972 | United Kingdom . |
| 1497454 | 1/1978 | United Kingdom . |
| 2261037 | 5/1993 | United Kingdom . |

*Primary Examiner*—David P. Bryant
*Attorney, Agent, or Firm*—MacMillan, Sobanski & Todd

[57] ABSTRACT

A bearing comprises an inner race, an outer race and rolling members interposed between the inner and outer races with a radial clearance c, greater or equal to zero, remaining. The bearing also comprises a partial sealing member attached to either the inner race or the outer race to one side of the rolling members and which defines a substantially annular chamber between the partial sealing member and the outer race or the inner race respectively. The substantially annular chamber has a length L and a width j and the width j is fractionally greater than the radial clearance c.

The partial sealing member may be formed integrally with either the inner race or the outer race or it may be formed separately and subsequently attached to either race as appropriate. The rolling members may be in any appropriate form, for instance balls or rollers.

6 Claims, 2 Drawing Sheets

METHOD OF SETTING A DESIRED FLOW RATE THROUGH A BEARING

This application is a continuation of Ser. No. 08/446,956, filed May 15, 1995, now abandoned.

BACKGROUND OF THE INVENTION

The invention relates to a bearing and more particularly to one for use between two parts rotating relative to each other and in a situation where there is pressurized fluid to one side of the bearing and unpressurized fluid, or a fluid level below the bearing, on the other side.

In the prior art, where a bearing is used between two parts rotating relative to each other in a situation where there is pressurized fluid to one side of the bearing and unpressurized fluid, or a fluid level below the bearing, on the other side a seal is usually required in addition to the bearing in order to prevent an unacceptable level of fluid leakage. This has the disadvantages of there being two separate parts with attendant increased cost and the problems of seal wear, seal deformation and seal fixing.

It is an object of the present invention to provide an improved bearing for use in the conditions described above.

SUMMARY OF THE INVENTION

The present invention therefore provides a bearing comprising an inner race, an outer race and rolling members interposed between the inner and outer races with a radial clearance c, greater than or equal to zero, remaining, the bearing being characterized in that it further comprises a partial sealing member attached to either the inner race or the outer race to one side of the rolling members and which defines a substantially annular chamber between the partial sealing member and the outer race or the inner race respectively, the substantially annular chamber having a length L and a width j and the width j is fractionally greater than the radial clearance c.

The bearing provides the advantage that it forms a partial seal and thus a separate seal is not required in addition to the bearing. This eliminates one part so reducing cost and simplifying construction. In addition, those parts of the bearing which determine the rate of fluid leakage through it do not suffer from wear, deformation or deterioration, as a seal would, and thus the fluid leakage rate is substantially constant over the life of the bearing.

The dimensions of the bearing, and in particular the substantially annular chamber, may be such that the length L is 2 to 1000 times greater than the width j. Preferably the dimensions are such that the length L is 10 to 1000 times greater than the width j, or 50 to 1000 times greater than the width j.

The substantially annular chamber may be of rectilinear cross section or of non-rectilinear cross section.

The partial sealing member may be formed as a separate part which is then attached to the inner or outer race as appropriate or it may be formed integrally with either the inner or outer race. The rolling members may be of any appropriate form, for instance balls or rollers.

The bearing may be used in applications with pressurized fluid to one side and no fluid, or substantially unpressurized fluid, to the other side of the substantially annular chamber. The dimensions of the substantially annular chamber being chosen to permit the required level of leakage through the bearing.

BRIEF DESCRIPTION OF THE DRAWINGS

Embodiments of the present invention will now be described, by way of example only, with reference to the accompanying drawings in which.

DETAILED DESCRIPTION OF THE PREFERRED EMBODIMENT

Figure 1:
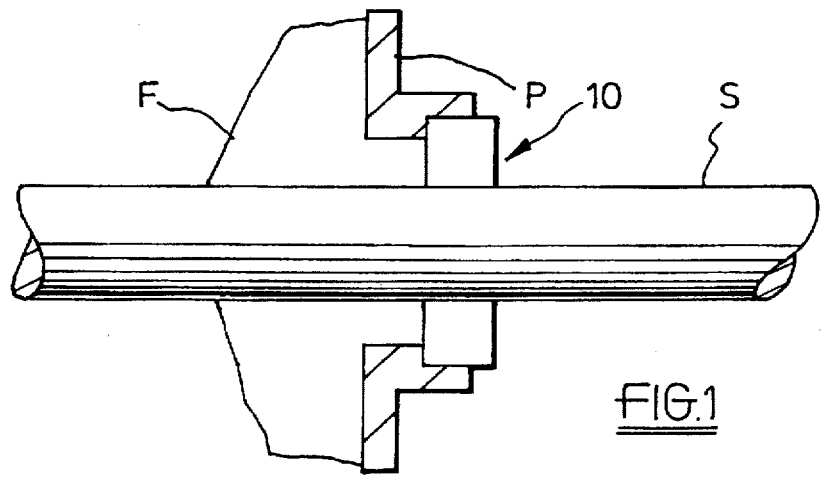
FIG. 1 shows a section through a typical application of a bearing according to the present invention.

Referring to FIG. 1, a bearing 10 is located around a shaft S supporting a part P such that the shaft S and part P are able to rotate relative to each other. To a first side (shown on the left in FIG. 1) of the bearing 10 and part P is fluid F, such as oil, under low pressure. To a second side (shown on the right in FIG. 1) of the bearing 10 and part P the fluid level is below the bearing and is not shown.

Figure 2:
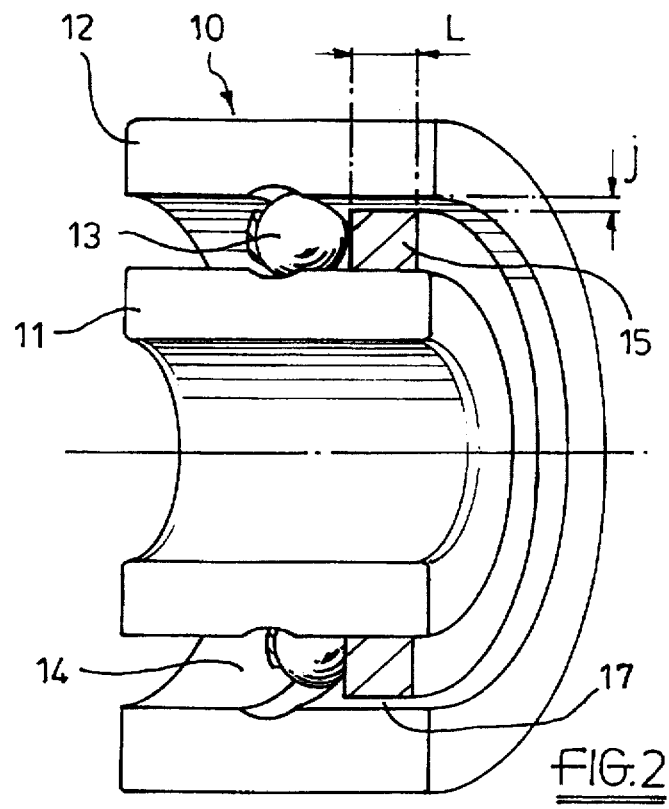
FIGS. 2 and 2a show sections through one embodiment of a bearing according to the present invention.
Figure 2A:
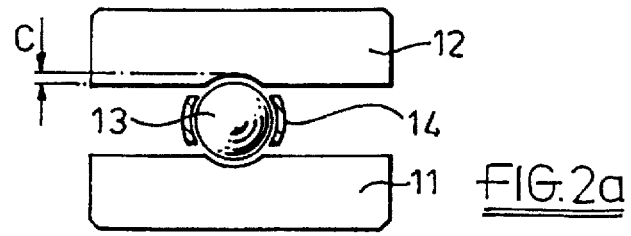
Figure 3:
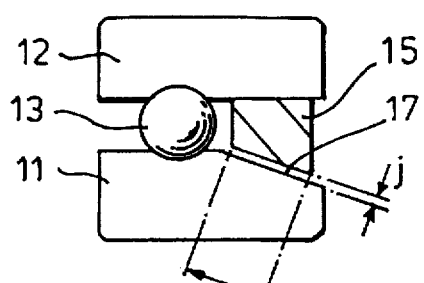
FIGS. 3 to 8 show sectional views of further embodiments of bearings according to the present invention.

Referring now also to FIG. 2, the bearing 10 incorporates an inner race 11, an outer race 12, balls 13 in a cage 14 interposed between the inner and outer races and a partial sealing ring 15. The balls 13 have a radial clearance c between the inner and outer races 11, 12, illustrated in FIG. 2a. An annular chamber 17 of length L and and width j, where j is slightly greater than the radial clearance c, is defined between the outer race 12 and the partial sealing ring 15. The chamber 17 permits a limited leakage of pressurized fluid F to occur through the bearing 10.

Clearly the dimensions of the bearing 10 are calculated for a particular application so that the leakage rate through the bearing is at an acceptable, or even required, level. To do this the flow of fluid through the annular chamber 17 is assumed to be laminar and thus is best described by Poiseuille's Law:

$$Q = \frac{\pi}{12} \frac{D j^3 \Delta P}{\mu L}$$

where Q is the fluid leakage rate through the bearing 10, D is the exterior diameter of the annular chamber 17, $\Delta P$ is the fluid pressure difference across the annular chamber 17, $\mu$ is the dynamic viscosity of the fluid and j and L are the width and length of the annular chamber 17 as shown in FIG. 2. As is usually the case the fluid flow through the annular chamber only approximates to annular flow and therefore the application of Poiseuille's Law is not exact but permits at least an order of magnitude calculation to be made. In addition, the dynamic viscosity of the fluid, $\mu$, varies with temperature and therefore the calculations are carried out at the operating temperature of the particular application.

For most applications many of the variables in Poiseuille's Law are essentially fixed before the bearing is designed, for instance the dynamic viscosity $\mu$ of the fluid, the pressure difference $\Delta P$, the external diameter of the annular chamber D and the length of the annular chamber L. Thus in general the only true variable for design purposes is the width j of the annular chamber.

One particular example of a bearing 10 for use in a wet clutch assembly was designed using the following parameter values: $\mu = 1.848$ m$^2$s$^{-1}$ (at 80 degrees centigrade), D=102 mm, L=3.7 mm and $\Delta P = 6 \times 10^4$ Pa. The width j of the annular chamber 17 is 64 µm with a production tolerance of 35 µm to 93 µm and a theoretical fluid leakage rate of 368 cm$^3$min$^{-1}$ varying from 60 cm$^3$min$^{-1}$ to 1130 cm$^3$min$^{-1}$ with production tolerances.

Figure 4:
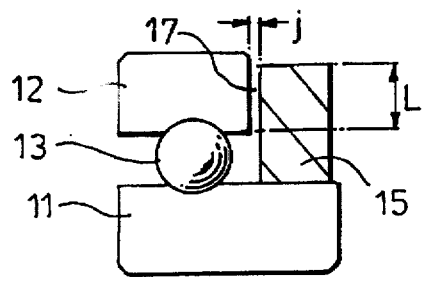
Figure 5:
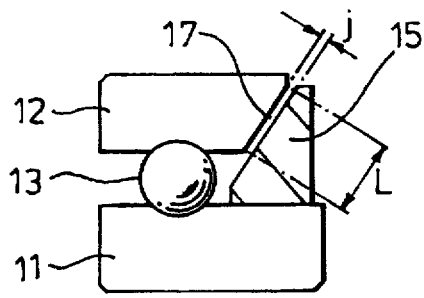
Figure 6:
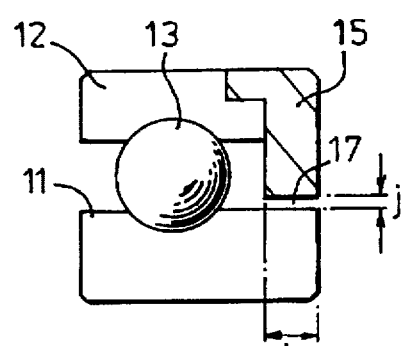
Figure 7:
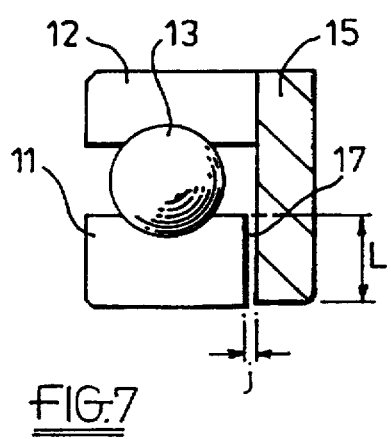
Figure 8:
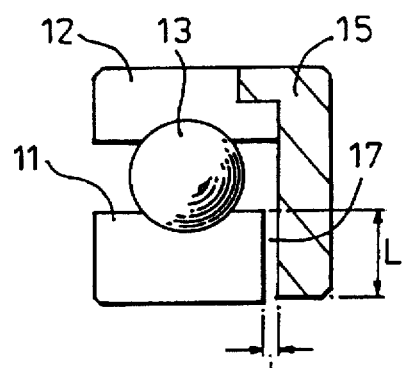

The cross sectional shape of the partial sealing ring 15, and its attachment to the inner or outer race 11, 12, may be chosen as appropriate for the application or for ease of construction or durability. FIGS. 3 to 8 show in cross section six alternatives of the partial sealing ring 15 and the forms of substantially annular chamber 17 defined by them. FIGS. 4 and 5 show the partial sealing ring 15 attached to the inner race 11 as in FIG. 2 while FIGS. 3, 6, 7 and 8 show the partial sealing ring 15 attached to the outer race 12. The cross sectional shapes of the partial sealing rings 15 of FIGS. 2 to 8 are given as examples only and are by no means the only possible cross sectional shapes which may be incorporated in embodiments of the bearing 10.

Figure 9:
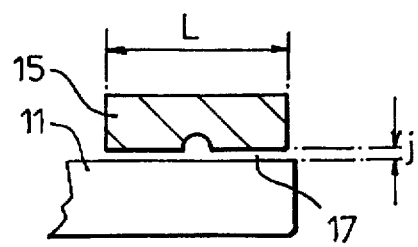
FIGS. 9 & 10 show partial sectional views of two further embodiments with substantially annular chambers of non-rectilinear cross section.
Figure 10:
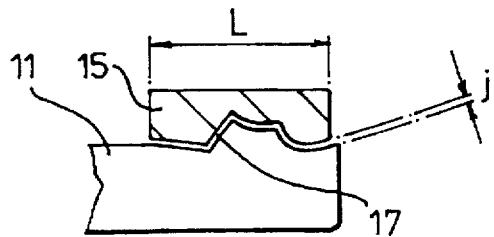

In particular the annular chamber 17 shown in each of FIGS. 2 to 8 is of substantially rectilinear cross section, ie with parallel sides. This, however, is not necessary and FIGS. 9 and 10 illustrate two embodiments in which the substantially annular chamber is of non-rectilinear cross section. In FIG. 9 this results purely from the cross sectional shape of the partial sealing ring 15 but in FIG. 10 the inner race 11 and the partial sealing ring 15 both contribute to the irregularity of the annular chamber 17.

The partial sealing ring 15 shown in each of FIGS. 2 to 8 has been formed as a separate part subsequently attached to the inner race 11 or the outer race 12 as appropriate. The attachment may have been by any appropriate method, for instance welding, gluing or by means of a clip or retaining member. As will be readily understood, the partial sealing ring 15 may, as an alternative, be formed integrally with either the inner or outer race as appropriate.

The materials from which the bearing 10 is constructed may be any which are appropriate for the application in which the bearing will be used.

The embodiments described above incorporate rolling members in the form of balls 13. The invention is equally applicable to bearings incorporating rolling members in other forms, for instance rollers. In addition embodiments of the bearing 10 may incorporate a plurality of rows of rolling members in place of the single row illustrated.

It should be noted that the bearing 10 can be used either with the partial sealing ring 15 between the rolling members 13 and the pressurized fluid F or on the side of the rolling members 13 distant from the fluid F. In the former case the fluid leakage rate through the bearing 10 must be sufficient to lubricate the bearing. In the latter case the rolling members are immersed in the pressurized fluid F and therefore adequately lubricated but will experience drag as a result of the immersion.

In the embodiment described above the bearing 10 is located between a part P and a shaft S both of which are rotatable. However, it will be readily appreciated that the bearing 10 is equally applicable, and indeed would more normally be used, in situations in which the part P supported the shaft S and was non-rotatable, and vice versa.

The bearing 10 provides the following advantages over prior art bearing and seal combinations. Firstly, a single part, the bearing 10, replaces two parts, a bearing and a seal, thus reducing cost and simplifying construction. Secondly, the bearing 10 provides a partially fluid-tight seal which does not suffer from wear which affects its ability to seal.

What is claimed is:

1. A method of setting a desired flow rate Q of a fluid of viscosity µ between two relatively rotating parts, the method comprising the steps of:

(a) fitting between the two parts a bearing comprising an inner race, an outer race, a plurality of rolling members interposed between said inner and outer races and a partial sealing member interposed between said inner and outer races and attached to either said inner race or said outer race adjacent to said plurality of rolling members, said partial sealing member defining a substantially annular chamber having an outer diameter D, a length L, and a width J; and (b) setting the diameter D, the length L and the width j of the substantially annular chamber according to the formula:

$$Q = \left( \frac{\Pi}{12} \right) \left( \frac{D j^3 \Delta P}{\mu L} \right)$$

where ΔP is the pressure difference between the two sides of the said bearing.

2. A method according to claim 1 wherein the dimensions of said substantially annular chamber are such that the length L is 2 to 1000 times greater than the width j.

3. A method according to claim 2 wherein the dimensions of said substantially annular chamber are such that the length L is 50 to 1000 times greater than the width j.

4. A method according to claim 1 wherein the dimensions of said substantially annular chamber are such that the length L is 50 to 1000 times greater than the width j.

5. A method according to claim 1 wherein said partial sealing member is situated on one side of said rolling members which is at a higher ambient pressure than an opposite side of said rolling members.

6. A method according to claim 5 wherein said fluid is a lubricant and said flow rate Q is a minimum flow rate which is necessary satisfactorily to lubricate said bearing.

* * * * *